US012793396B2

(12) United States Patent
Martinez et al.

(10) Patent No.: US 12,793,396 B2
(45) Date of Patent: Nov. 10, 2026

(54) AUTOMATED ANNOTATION OF VISUAL DATA THROUGH COMPUTER VISION TEMPLATE MATCHING

(71) Applicant: Telefonaktiebolaget LM Ericsson (publ), Stockholm (SE)

(72) Inventors: Fernando Martinez, Wylie, TX (US); Jose Joaquin Murillo Sierra, Frisco, TX (US); Mahesh Chilakala, Plano, TX (US); Mitesh Thakkar, Allen, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 634 days.

(21) Appl. No.: 18/018,276

(22) PCT Filed: Jul. 27, 2020

(86) PCT No.: PCT/IB2020/057082
§ 371 (c)(1),
(2) Date: Jan. 27, 2023

(87) PCT Pub. No.: WO2022/023787
PCT Pub. Date: Feb. 3, 2022

(65) Prior Publication Data
US 2023/0260262 A1 Aug. 17, 2023

(51) Int. Cl.
*G06V 10/774* (2022.01)
*G06T 7/11* (2017.01)
(Continued)

(52) U.S. Cl.
CPC ............ *G06V 10/7753* (2022.01); *G06T 7/11* (2017.01); *G06T 7/70* (2017.01); *G06V 10/25* (2022.01);
(Continued)

(58) Field of Classification Search
CPC ........ G06T 2207/20081; G06F 18/214; G06V 10/7753
See application file for complete search history.

(56) References Cited

U.S. PATENT DOCUMENTS 10,049,308 B1 * 8/2018 Dhua ...................... G06T 11/60
10,936,902 B1 * 3/2021 Bagwell .................... G06T 7/73
(Continued)

FOREIGN PATENT DOCUMENTS

CN 110032980 A * 7/2019 ............. G06N 3/045

OTHER PUBLICATIONS

Desai, Sai Vikas, and Vineeth N. Balasubramanian. "Towards fine-grained sampling for active learning in object detection." Proceedings of the IEEE/CVF conference on computer vision and pattern recognition workshops. 2020. (Year: 2020).*
(Continued)

*Primary Examiner* — Michael Robert Cammarata
(74) *Attorney, Agent, or Firm* — Sage Patent Group

(57) ABSTRACT

A method of generating labeled training images for a machine learning system includes providing a set of labeled images, each of the labeled images in the set of labeled images depicting an instance of a type of object and comprising a label identifying the type of object, providing an unlabeled image including an instance of the object, generating bounding box coordinates for one or more bounding boxes around the instance of the object in the unlabeled image using the labeled images in the set of labeled images as templates, consolidating the one or more bounding boxes into a consolidated bounding box around the instance of the object in the unlabeled image, and labeling the consolidated bounding box according to the type of object to generate a labeled output image including bounding box coordinates of the consolidated bounding box.

20 Claims, 18 Drawing Sheets

(51) Int. Cl.
*G06T 7/70* (2017.01)
*G06V 10/25* (2022.01)
*G06V 10/75* (2022.01)
*G06V 20/70* (2022.01)

(52) U.S. Cl.
CPC ............ *G06V 10/751* (2022.01); *G06V 20/70* (2022.01); *G06T 2207/20081* (2013.01); *G06T 2207/20132* (2013.01); *G06V 2201/07* (2022.01)

(56) References Cited

U.S. PATENT DOCUMENTS

| | | | | |
|---|---|---|---|---|
| 11,238,374 | B2 * | 2/2022 | Kao | G06T 7/70 |
| 11,587,301 | B2 * | 2/2023 | Deng | G06V 10/82 |
| 11,763,565 | B2 * | 9/2023 | Rhodes | G06V 20/49 |
| 12,340,538 | B2 * | 6/2025 | Venkataraman | G06N 3/08 |
| 12,367,588 | B2 * | 7/2025 | Li | G06N 3/04 |
| 2011/0052063 | A1 * | 3/2011 | McAuley | G06V 20/35 382/224 |
| 2016/0155011 | A1 * | 6/2016 | Sulc | G06V 10/757 382/103 |
| 2017/0011281 | A1 * | 1/2017 | Dijkman | G06V 10/768 |
| 2018/0114334 | A1 * | 4/2018 | Desai | G06V 10/82 |
| 2019/0073564 | A1 * | 3/2019 | Saliou | G06V 10/255 |
| 2019/0130189 | A1 * | 5/2019 | Zhou | G06V 10/7515 |
| 2019/0213420 | A1 * | 7/2019 | Karyodisa | G06V 20/41 |
| 2020/0380300 | A1 * | 12/2020 | Zhang | G06F 18/2411 |
| 2020/0394425 | A1 * | 12/2020 | Misra | G06F 18/23 |
| 2021/0406614 | A1 * | 12/2021 | Arroyo | G06F 18/2163 |
| 2022/0322592 | A1 * | 10/2022 | Rinne | H05K 13/0486 |
| 2023/0351724 | A1 * | 11/2023 | Hou | G06V 20/46 |

OTHER PUBLICATIONS

J. Lee, S. Walsh, A. Harakeh and S. L. Waslander, "Leveraging Pre-Trained 3D Object Detection Models for Fast Ground Truth Generation," 2018 21st International Conference on Intelligent Transportation Systems (ITSC), Maui, HI, USA, 2018, pp. 2504-2510, doi: 10.1109/ITSC.2018.8569793. (Year: 2018).*

V. W. H. Wong, M. Ferguson, K. H. Law and Y.-T. T. Lee, "An Assistive Learning Workflow on Annotating Images for Object Detection," 2019 IEEE International Conference on Big Data (Big Data), Los Angeles, CA, USA, 2019, pp. 1962-1970, doi: 10.1109/BigData47090.2019.9006588. (Year: 2019).*

International Search Report and Written Opinion of the International Searching Authority, PCT/IB2020/057082, mailed Apr. 26, 2021, 11 pages.

Ren, S., et al., "Faster R-CNN: Towards real-time object detection with region proposal networks," IEEE Trans. Pattern Analysis and Machine Intelligence, 2017, 9 pages.

Liu, W., "SSD: Single shot multibox detector," in Proc. European Conf. Computer Vision, Dec. 29, 2016, 17 pages.

Redmon, J., et al., "YOLO9000: Better, faster, stronger," in Proc. IEEE Conf. Computer Vision and Pattern Recognition, http://pjreddie.com/yolo9000/ 2017, 9 pages.

"LabelImg is a graphical image annotation tool and label object bounding boxes in images," LabelImg, https://github.com/tzutalin/labelImg#installation downloaded Apr. 21, 2020, 6 pages.

"Tensorflow Object Detection Modeling," Tensorflow/models, https://github.com/tensorflow/models/tree/master/research/object_detection, downloaded Apr. 21, 2020, 7 pages.

"Label Images and Video for Computer Vision Applications," Cartucho/OpenLabeling, https://github.com/Cartucho/OpenLabeling downloaded Apr. 21, 2020, 4 pages.

"Visual Object Tagging Tool: an Electron App for Building End to End Object Detection Models from Images and Videos," Microsoft VOTT, https://github.com/microsoft/VoTT downloaded Apr. 21, 2020, 13 pages.

"Powerful and Efficient Computer Vision Annotation Tool (CVAT)," Computer Vision Annotation Tool (CVAT), https://github.com/opencv/cvat, downloaded Apr. 21, 2020, 4 pages.

Canu, S., Pysouce, Check If Two Images Are Equal, https://pysource.com/2018/07/19/check-if-two-images-are-equal-with-opencv-and-python/, Jul. 19, 2018, 6 pages.

OpenCV, Open Source Computer Vision Template Matching, https://docs.opencv.org/master/d4/dc6/tutorial_py_template_matching.html, downloaded Apr. 21, 2020, 3 pages.

Rosebrock, A., PhD., Pyimagesearch, Intersection over Union for Object Detection, https://www.pyimagesearch.com/2016/11/07/intersection-over-union-iou-for-object-detection/, Nov. 7, 2016, 9 pages.

Rosebrock, A., PhD., Pyimagesearch, Anomaly Detection with OpenCV, https://www.pyimagesearch.com/2020/01/20/intro-to-anomaly-detection-with-opencv-computer-vision-and-scikit-learn/, Jan. 20, 2020, 13 pages.

Scikit Learn, Isolation Forest, https://scikit-learn.org/stable/modules/generated/sklearn.ensemble.IsolationForest.html#sklearn.ensemble.IsolationForest, downloaded Apr. 21, 2020, 5 pages.

Liu, F. T., et al., "Isolation-based Anomaly Detection," ACM Transactions on Knowledge Discovery from Data, 6(1) Mar. 2012, https://cs.nju.edu.cn/zhouzh/zhouzh.files/publication/tkdd11.pdf, 44 pages.

Li Liu, et al., "Deep Learning for Generic Object Detection: a Survey," ARXIV.org, Cornell University Library, Ithaca, NY, Sep. 6, 2018 (XP081368181) 58 pages.

Lucey S., et al., "Initialised Eigenlip Estimator for Fast Lip Tracking Using Linear Regression," IEEE Proceedings 15$^{th}$ International Conference on Pattern Recognition, Barcelona, Spain, Sep. 3-7, 2000, XP010533258, 4 pages.

Solovyev, et al., "Weighted Boxes Fusion: ensembling boxes for object detection modes", Image and Vision Computing, XP093060999, Online, Oct. 29, 2019, 3 pages.

* cited by examiner

| Filename | Classification | Xmin | Ymin | Xmax | Ymax |
|---|---|---|---|---|---|
| Image1.jpg | productType1 | ### | ### | ### | ### |
| Image1.jpg | productType1 | ### | ### | ### | ### |
| Image1.jpg | productType1 | ### | ### | ### | ### |
| Image1.jpg | productType1 | ### | ### | ### | ### |

AUTOMATED ANNOTATION OF VISUAL DATA THROUGH COMPUTER VISION TEMPLATE MATCHING

CROSS REFERENCE TO RELATED APPLICATIONS

This application is a 35 U.S.C. § 371 national stage application of PCT International Application No. PCT/IB2020/057082 filed on Jul. 27, 2020, the disclosure and content of which is incorporated by reference herein in its entirety.

TECHNICAL FIELD

The inventive concepts relate to machine learning systems, and in particular to automated systems and methods for generating labeled images for training machine learning systems.

BACKGROUND

The emergence of CNN (Convolutional Neural Network) based visual object detection systems (or object detectors) has caused a rapid acceleration in the fields of object detection and classification. To detect and classify objects in images with a high level of accuracy, CNN based detectors require large amounts of labeled data for training. There is an increasing demand for image and video annotation tools that can generate the enormous datasets needed to train CNN-based object detection systems.

To generate large labeled datasets for training, manual effort is traditionally needed to process image media and determine that a target object exists within the image, and then to label and annotate the media accordingly. Efforts to generate labeled training data initially focused on simple platforms for the labeling of static images. Later, more advanced systems with integrated trackers started to emerge. Video annotation tools were developed with conventional trackers to follow a bounding box (BB) that is manually drawn in the initial frame around an object of interest. Low confidence models have also been used to automate object detection and generate labeling annotations.

SUMMARY

A method of generating labeled training images for a machine learning system includes providing a set of labeled images, each of the labeled images in the set of labeled images depicting an instance of a type of object and comprising a label identifying the type of object, providing an unlabeled image including an instance of the object, generating bounding box coordinates for one or more bounding boxes around the instance of the object in the unlabeled image using the labeled images in the set of labeled images as templates, consolidating the one or more bounding boxes into a consolidated bounding box around the instance of the object in the unlabeled image, and labeling the consolidated bounding box according to the type of object to generate a labeled output image including bounding box coordinates of the consolidated bounding box.

Generating the bounding box coordinates for the one or more bounding boxes around the instance of the object in the unlabeled image may include repeatedly performing a template matching technique on the first unlabeled image using each of the labeled images as a template.

The method may further include providing a first set of raw images each containing one or more labeled instances of the type of object, generating sets of bounding box coordinates of bounding boxes surrounding the one or more labeled instances of the type of object in each of the raw images in the set of raw images, and cropping the labeled instances of the type of object from each of the raw images using the bounding box coordinates of the bounding boxes around the instances of the type of object to provide a set of cropped and labeled images, wherein the set of cropped and labeled images are used as templates in the template matching technique.

Consolidating the one or more bounding boxes into a consolidated bounding box around the instance of the object may include identifying a bounding box from among the one or more bounding boxes as a ground truth bounding box, for each of the one or more bounding boxes other than the ground truth bounding box, generating an intersection over union metric, wherein the intersection over union metric is calculated as an area of intersection of the selected bounding box with the ground truth bounding box divided by an area of overlap of the selected bounding box with the ground truth bounding box, excluding bounding boxes from the one or more bounding boxes for which the intersection over union metric is less than a predetermined threshold, and averaging the one or more bounding boxes other than the excluded bounding boxes to obtain the consolidated bounding box.

The method may further include applying an anomaly detection technique to identify anomalous bounding boxes from the one or more bounding boxes around the instance of the object in the unlabeled image.

The method may further include dividing the set of labeled images into a plurality of subsets of labeled images, wherein each subset of labeled images comprises a view of the object from a unique perspective, and for each subset of labeled images, repeating steps of: using the labeled images in the subset of labeled images as templates, generating bounding box coordinates for one or more bounding boxes around the instance of the object in the unlabeled image, consolidating the one or more bounding boxes generated based on the subset of labeled images into a consolidated bounding box around the instance of the object, and labeling the consolidated bounding box as corresponding to the object to generate a labeled output image including bounding box coordinates of the consolidated bounding box.

The unlabeled image may be one of a plurality of unlabeled images, and the method may further include, for each unlabeled image of the plurality of unlabeled images, performing operations of generating bounding box coordinates for one or more bounding boxes around the instance of the object in the unlabeled image, consolidating the one or more bounding boxes into a consolidated bounding box around the instance of the object, and labeling the consolidated bounding box as corresponding to the object to generate a labeled output image including bounding box coordinates of the consolidated bounding box, to obtain a plurality of labeled output images. The method may include training the machine learning algorithm to identify objects of interest in a second unlabeled image using the plurality of labeled output images.

Generating bounding box coordinates for one or more bounding boxes around the instance of the object in the unlabeled image using the labeled images in the set of labeled images as templates may include correlating the labeled images with the unlabeled image to generate a correlation metric, and comparing the correlation metric to a threshold.

The method may further include training a machine learning algorithm to identify objects of interest in a second unlabeled image using the labeled output image.

An image labeling system according to some embodiments includes a processing circuit and a memory coupled to the processing circuit, The memory contains computer program instructions that, when executed by the processing circuit, cause the image labeling system to perform operations including providing a set of labeled images, each of the labeled images in the set of labeled images depicting an instance of a type of object and comprising a label identifying the type of object, providing an unlabeled image including an instance of the object, generating bounding box coordinates for one or more bounding boxes around the instance of the object in the unlabeled image using the labeled images in the set of labeled images as templates, consolidating the one or more bounding boxes into a consolidated bounding box around the instance of the object in the unlabeled image, and labeling the consolidated bounding box according to the type of object to generate a labeled output image including bounding box coordinates of the consolidated bounding box.

A method of generating labeled training images for a machine learning system according to some embodiments includes providing a plurality of bounding box images showing instances of a target object, grouping the plurality of bounding box images into groups of bounding box images showing the target object from similar perspectives, using the bounding box images of a group of bounding box images as templates to identify target object in an unlabeled image and generating bounding boxes based on template matching, consolidating the generated bounding boxes to provide a consolidated bounding box, labeling the consolidated bounding box to provide a labeled image, and training a machine language model using the labeled image.

The method may further include, for a plurality of groups of labeled bounding box images, repeating operations of using generating bounding boxes based on template matching, consolidating the generated bounding boxes to obtain a consolidated bounding box, and labeling the consolidated bounding box to provide a labeled image.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1A:
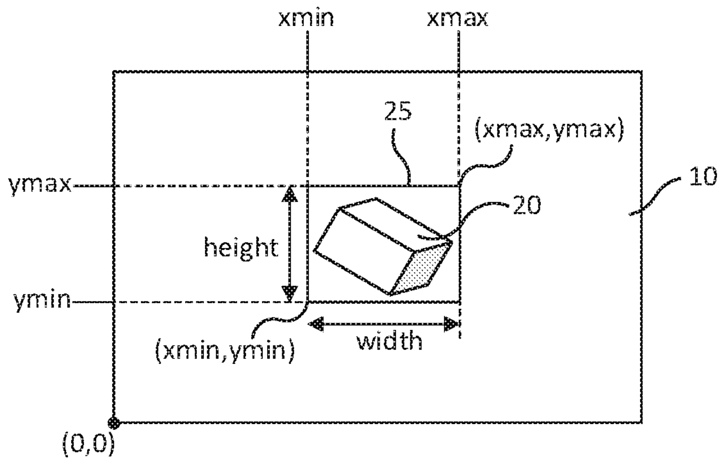
FIG. 1A illustrates an image in which a target object is depicted.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Some embodiments described herein provide systems/methods that can be used to perform automated object detection and bounding box generation and labeling on images with reduced/minimal human effort. Some embodiments may be employed with images of installations in which one or more target object has been placed or installed. Some embodiments use manual inputs for image classification and apply template matching methods against new images to generate annotated images.

Some embodiments can automate and streamline data acquisition and labelling tasks needed for machine learning object detection. Some embodiments may reduce the amount of time needed to prepare a dataset for machine learning object detection. The use of automation with computer vision methods according to some embodiments may reduce the manual effort and expense needed to generate large training datasets.

Image classification and labeling typically involves annotating a set of two-dimensional (2D) images using bounding boxes that identify the location of one or more objects of interest within the image. As an example, an image may include an image showing a telecommunications installation. The image could contain multiple objects of interest (also called target objects), such as remote radio units, antennas, etc. An organization, such as a telecommunications service provider, may have thousands of images in which one or more target objects may be depicted, and may wish to identify target objects within the images.

The systems/methods described herein us an initial input dataset that may be generated manually. For example, a user may start with a number (e.g., several hundred) of images in an initial set of images. The user may inspect the initial set of images and manually locate target objects within the images. A box, referred to as a bounding box, is drawn around each target object, and the bounding box is annotated with a description or classification of the target object defined by the bounding box.

It will be appreciated that a bounding box (BB) is simply a box drawn around an object of interest, and is characterized by the location and size of the bounding box. The location of the bounding box may be specified by the coordinates of a corner of the bounding box, such as the upper left hand corner of the bounding box, relative to the overall image. The size of the bounding box may be specified by the height and width of the bounding box. Thus, the location and size of the bounding box may be characterized by four values, namely, the minimum and maximum x and y values of the bounding box: xmax, xmin, ymax, ymin. Alternatively, the location and size of the bounding box may be characterized by the four values x-position (xmin), y-position (ymin), height, and width.

For example, FIG. 1A illustrates an image 10 in which a target object 20 is depicted. The target object 20 may be said to be depicted "in" or "on" the image 10. Although only a single target object 20 is depicted in image 10, it will be appreciated that the image 10 may depict or include multiple target objects of a same or different type of object.

The target object 20 is circumscribed by a rectangular bounding box 25 that is characterized by its location within the image 10 as defined by a minimum x-position (xmin), a minimum y-position (ymin), a maximum x-position (xmax), and a maximum y-position (ymax) relative to an origin (0,0) located at the lower left corner of the image 10.

Alternatively, the location of the bounding box 25 can be defined by the location of the lower left corner of the bounding box 25, along with the height and width of the bounding box 25. The bounding box 25 has a height and a width defined respectively by the vertical and horizontal spans of the target object 20. The vertical span of the target object 20 is equal to ymax-ymin, and the horizontal span of the target object 20 is equal to xmax-xmin. The bounding box 25 may be annotated manually in the initial set of images to identify the type of object circumscribed by the bounding box.

Figure 1B:
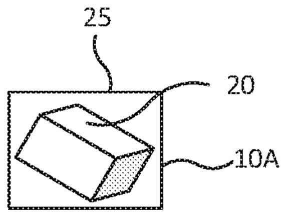
FIG. 1B illustrates a cropped bounding box image depicting a target object.

Referring to FIG. 1B, the bounding box 25 may be cropped from the image 10 and stored as a separate image 10A to be used as a template for object detection as described in more detail below.

Figure 2:
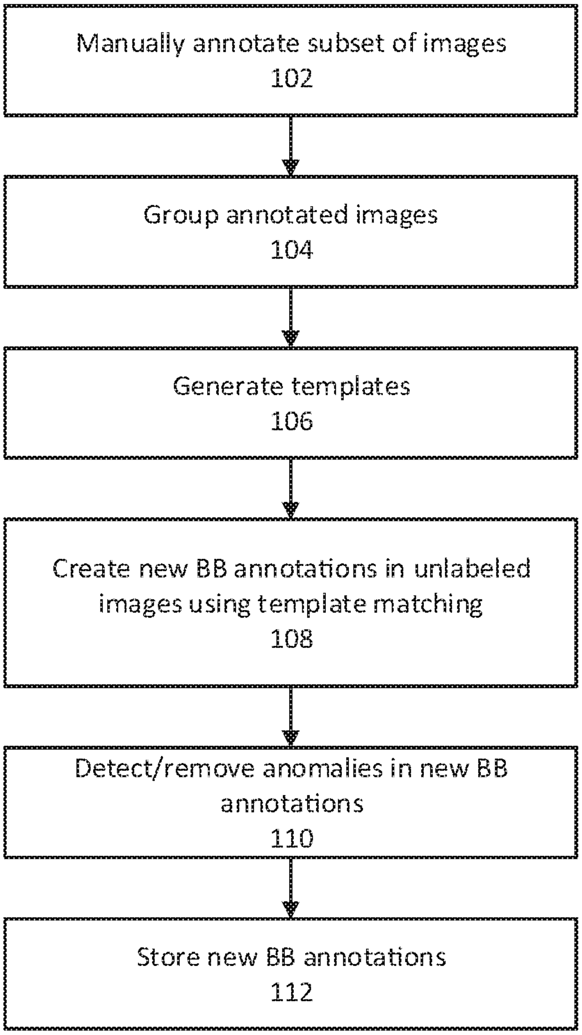
FIGS. 2, 3A, 3B and 4 are flowcharts illustrating operations of systems/methods according to some embodiments.
Figure 3A:
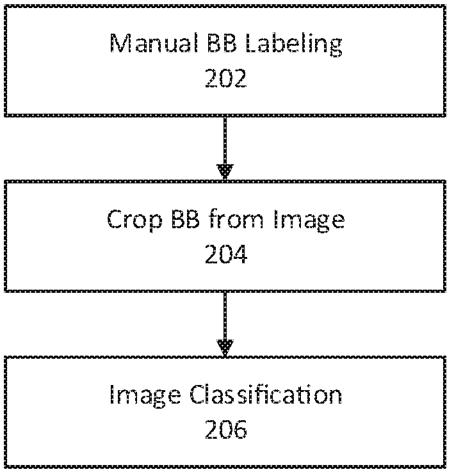

Referring to FIG. 2, a high-level overview of the operations of systems/methods for annotating a set of images according to some embodiments is illustrated. As shown therein, the operations include manually annotating a subset of the images (block 102) to obtain a set of annotated images. Operations of block 102 are illustrated in more detail in FIG. 3A, to which brief reference is made. As shown therein, to manually annotate the images, bounding boxes are manually defined around objects of interest in the subset of the images, and the bounding boxes are labeled according to object type (block 202). The manually defined bounding boxes are cropped from the images (block 204), and the resulting cropped images are classified according to the type of object in the image (block 206).

Figure 3B:
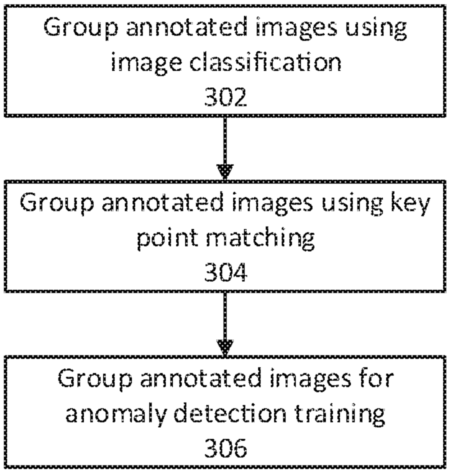

Returning to FIG. 2, beginning at block 104, an automated process is defined. In a first step of the automated process, the annotated images are grouped according to classification to obtain groups of annotated images. Grouping of annotated images is illustrated in more detail in FIG. 3B, to which brief reference is made. As shown therein, the annotated images are grouped first using image classification into groups of similar objects (block 302). The images are further grouped using key point matching (described in more detail below) to obtain groups of images of like objects in which the objects are positioned in a similar manner (block 304). Finally, the annotated images are grouped for anomaly detection training, as described in more detail below (block 306).

Returning to FIG. 2, once the cropped and annotated images have been grouped according to type and key point matching, the operations proceed to block 106 to generate templates from the cropped and annotated images for template matching. The operations then perform template matching on unprocessed images (i.e., images from the original set of images other than the subset of images that have been manually processed) to generate new bounding boxes in the unprocessed images.

Figure 4:
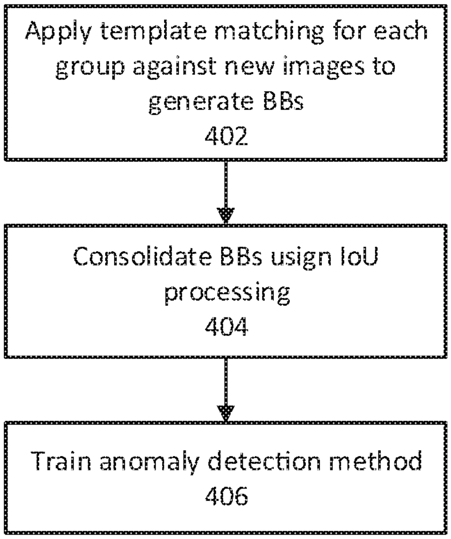

The use of template matching on new images to generate new bounding boxes in the unprocessed images is illustrated in more detail in FIG. 4, to which brief reference is made. As shown therein, for each new image, template matching, based on templates created from the manually annotated and cropped images, is applied to generate new bounding boxes in the new images (block 402). As a result of the template matching, multiple bounding boxes may be defined in each new image. The bounding boxes are then consolidated, for example, using an intersection over union technique as described in more detail below, to obtain consolidated bounding boxes in the new images (block 404). Finally, an anomaly detection system is trained (block 406) using the grouped annotated images from block 306 above.

Returning to FIG. 2, operations then detect and remove anomalies from the annotated bounding boxes generated from the new figures (block 110). The remaining annotated bounding boxes are then stored (block 112). At the end of the process, all of the new images will have been processed to identify objects of interest therein and to define annotated bounding boxes corresponding to the locations of the objects of interest in the images.

Operations of the systems/methods illustrated in FIGS. 2 to 4 will now be described in more detail.

Figure 5:
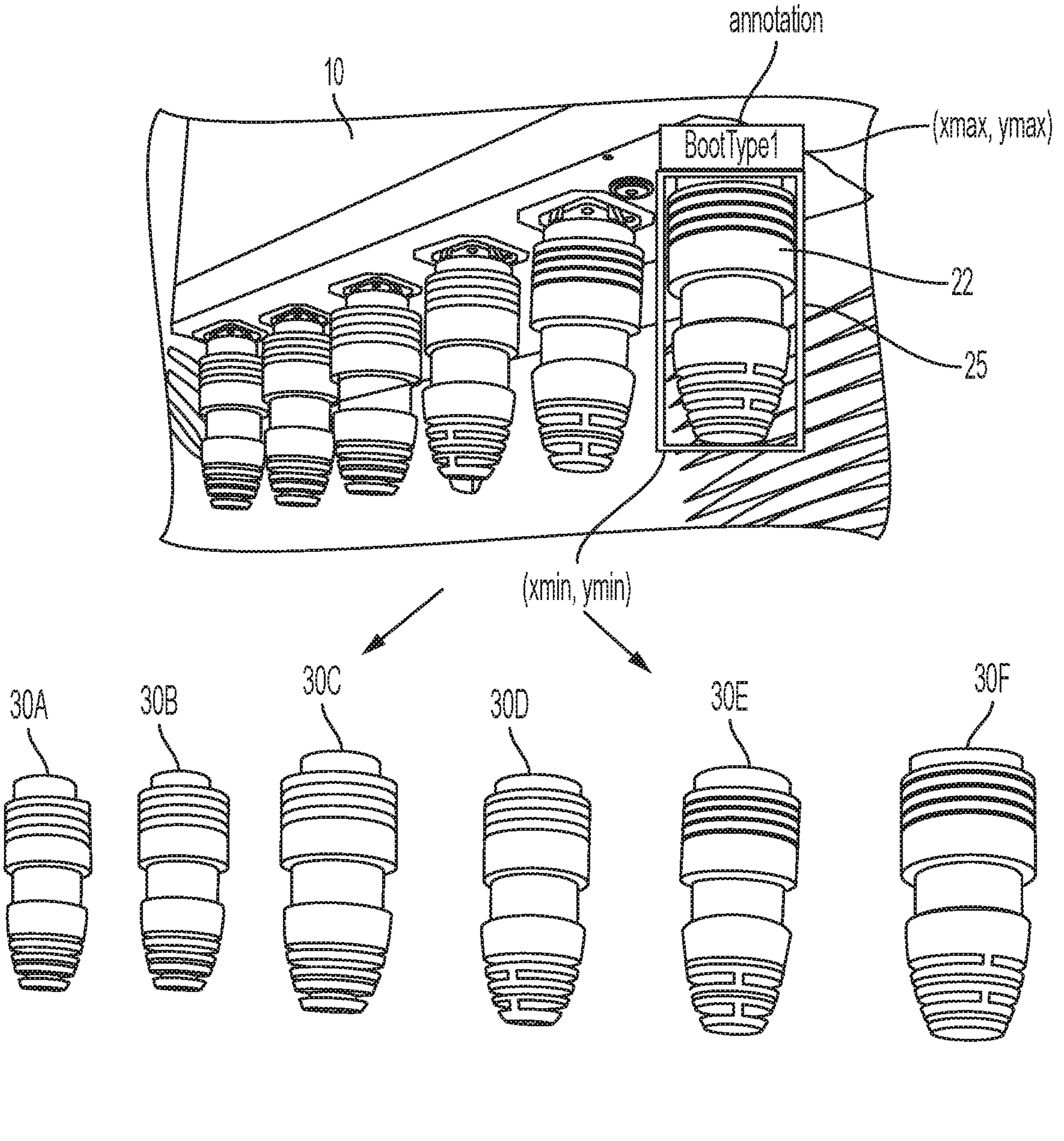
FIG. 5 illustrates cropping and annotation of bounding boxes in an image.

Manual bounding box annotation and cropping is illustrated in FIG. 5, which illustrates an image 10 of a telecommunications installation in which multiple instances of a type of wireless/cellular communication equipment are depicted. In particular, FIG. 5 illustrates an image that shows six instances of a particular type of rubber equipment cover, or boot, 22, that covers an RF port on equipment in a telecommunications installation. The image 10 may be manually processed by having a user identify the instances of the boots 22 in the image and draw bounding boxes 25 around each instance. As explained above, each bounding box 25 may be characterized by four values, namely, xmin, xmax, ymin and ymax, which can be expressed as bounding box coordinates (xmin, ymin), (xmax, ymax). Each bounding box 25 is also manually annotated with the type of object depicted. In this case, the type of object is annotated as "BootType1." Each annotation on a single image may be stored in a record containing fields "file name", "image width", image height", "BB annotation", "xmin", "xmax", "ymin" and "ymax". Still referring to FIG. 5, each bounding box 25 is then manually cropped from the image 10 and stored as a separate image 30A-30F, referred to as a "bounding box image" or "BB image." For each separate BB image, the fields "image name", "image width", image height", and "annotation" are stored. It will be appreciated that each instance of the object in the image 10 may appear with different size, shading and/or orientation due to lighting and position differences. Moreover, some of the objects may be partially occluded by intervening features in the image 10. It will be further appreciated that the picture may depict objects of interest that are of different types, e.g., other types of boots and/or objects of interest other than boots.

Figure 6A:
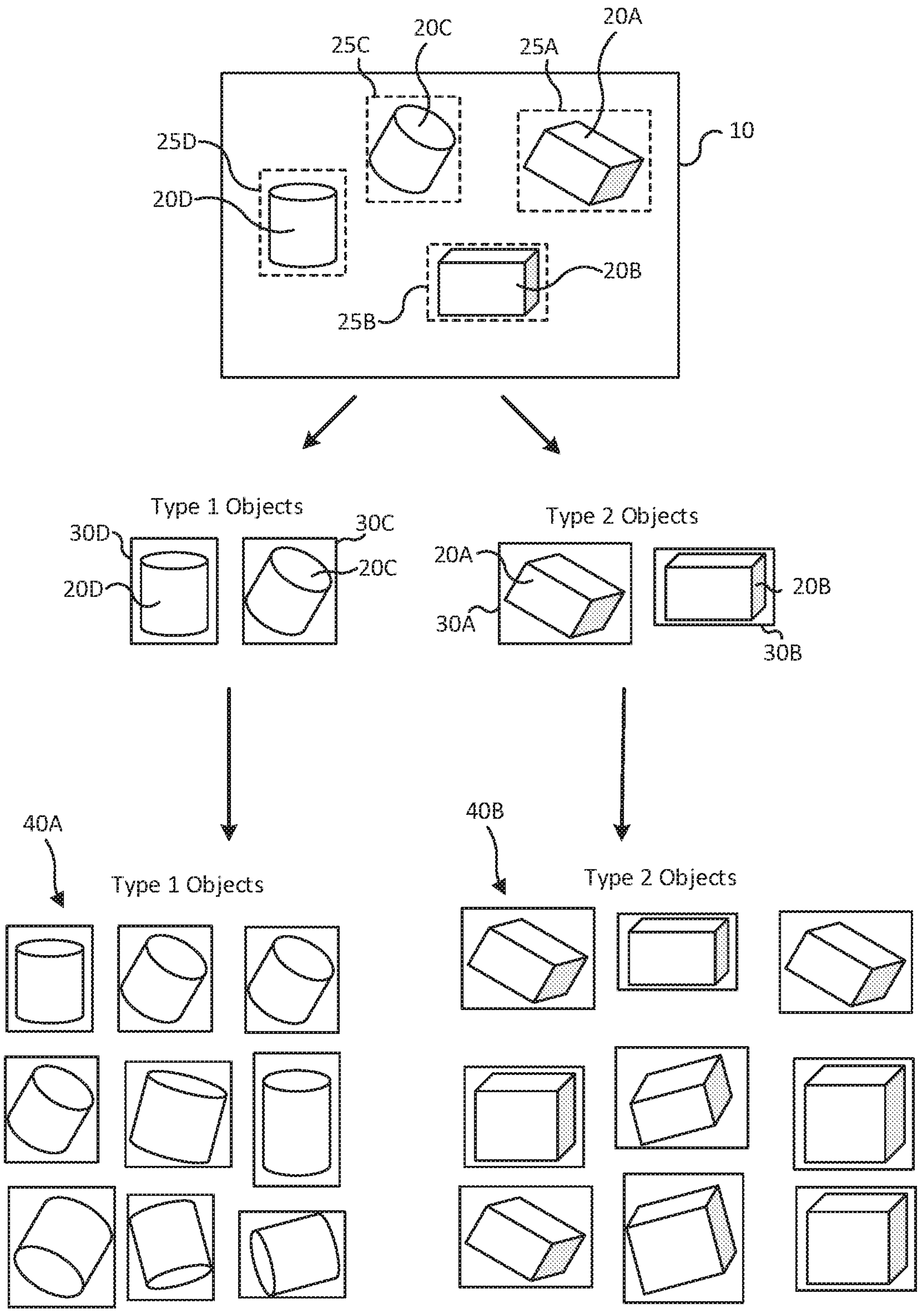
FIGS. 6A and 6B illustrate grouping of bounding box images.

The cropped and annotated images that are manually generated as described above are then grouped together according to object type. Grouping of images using image classification is illustrated in FIG. 6A. As shown therein, a image 10 depicts several objects 20A-20D of different type and orientation that have been circumscribed by respective bounding boxes 25A-25D. The objects in image 10 represent two types, namely, Type 1 objects and Type 2 objects. The objects have different sizes, shading and/or orientation in image 10. The bounding boxes 25A-25D are cropped to form individual BB images 30A-30D, which are then grouped by object type, i.e., Type 1 objects shown in BB images 30C and 30D are grouped together, and Type 2 objects shown in BB images 30A and 30B are grouped together.

This process is repeated for all images in the subset of images, to obtain a first grouped set 40A of BB images showing Type 1 objects in various orientations and a second grouped set 40B of BB images of Type 2 objects in various orientations.

BB images within the grouped sets 40A and 40B are then further grouped using key point detection/matching. Key point detection may be performed algorithmically by a system/method that performs edge detection on an image and then identifies points of interest, such as corners, in the image. Grouping of BB images using key point matching is illustrated in FIGS. 6B, 7 and 8.

Figure 6B:
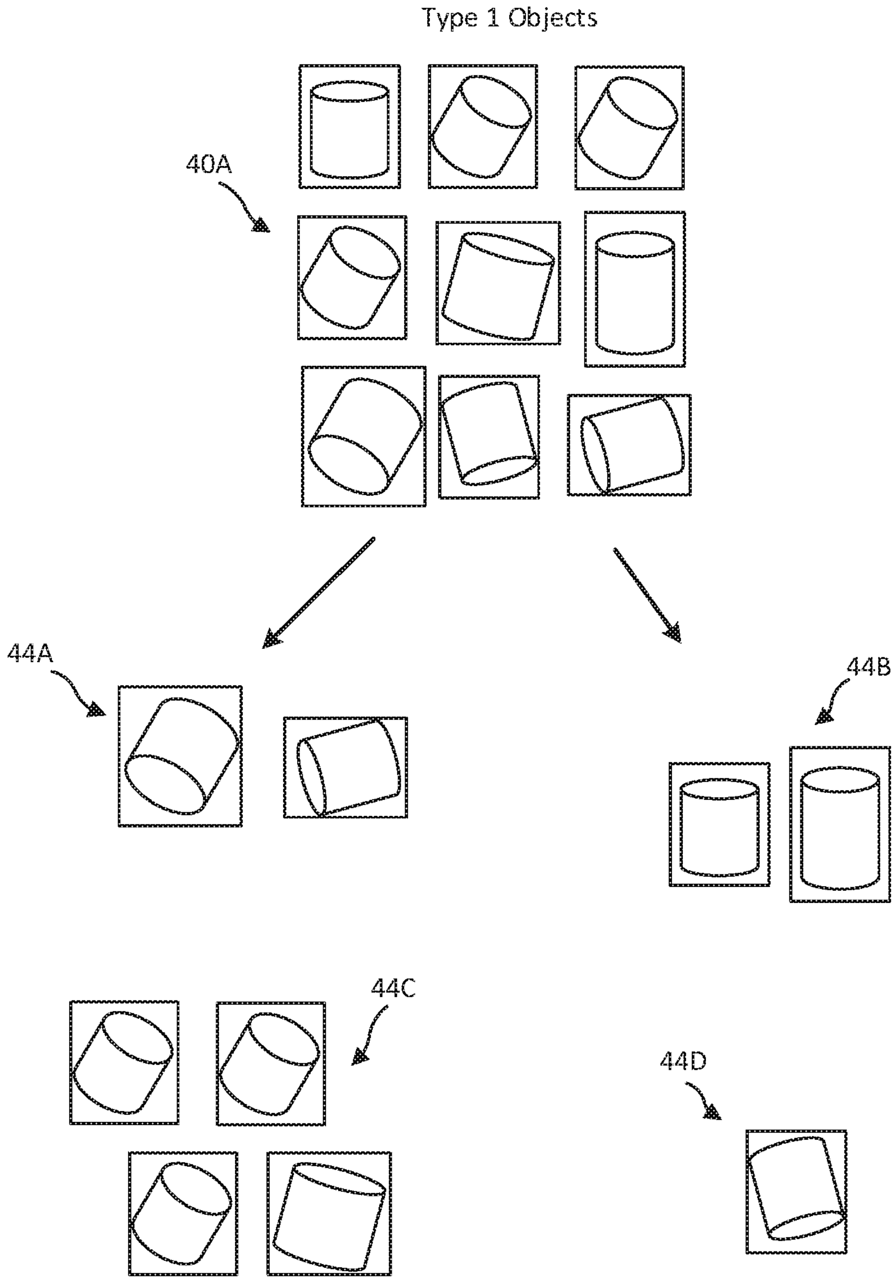

Referring to FIG. 6B, the Type 1 objects grouped into set 40A shown in FIG. 6A are further grouped into subsets 44A to 44D, each of which includes cropped images showing the object of interest in a substantially similar perspective view.

Figure 7:
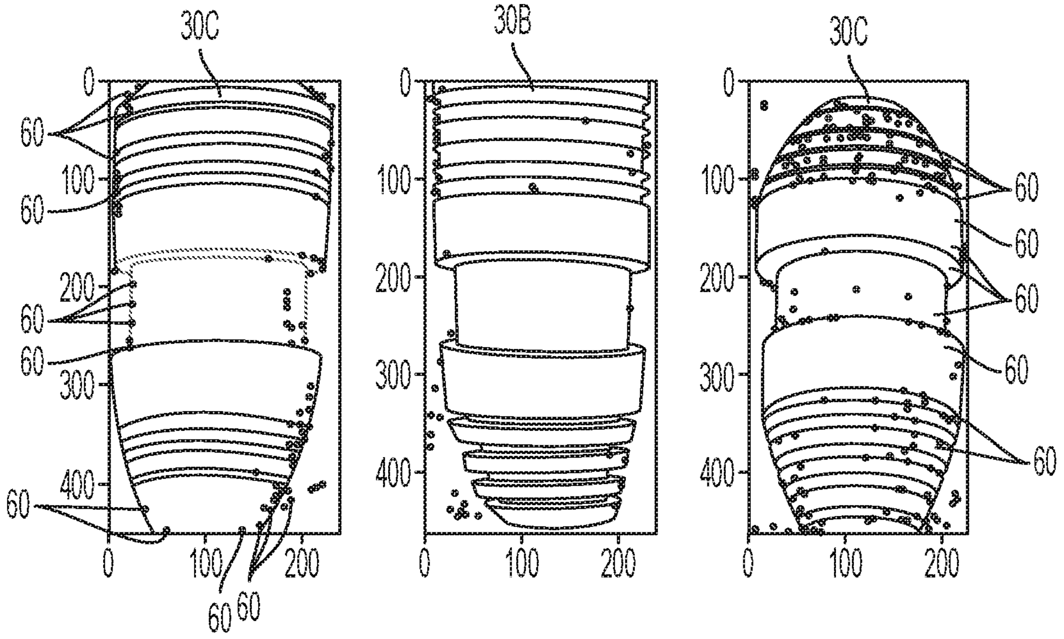
FIGS. 7 and 8 illustrate key point detection and matching in bounding box images.
Figure 8:
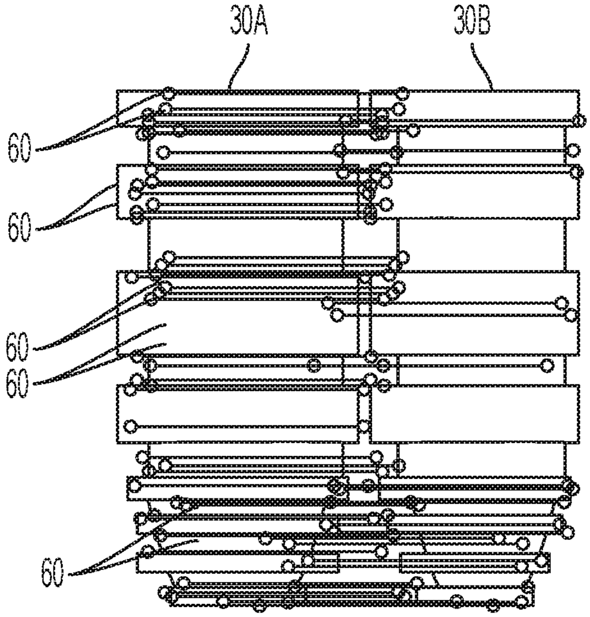

FIG. 7 shows three BB images 30A-30C of an object of interest (in this example, a rubber boot), in which a number of key points 60 have been identified in the images. Like BB images within the grouped sets are then further grouped using key point matching as shown in FIG. 8. As shown therein, key point matching involves identifying key points 60 in a first BB image and then identifying matching key points in a second BB image. A score is generated based on the number of matches that defines whether the BB images are sufficiently similar to be grouped together. That is, if there is a relatively high count of key point matches, then two BB images may be grouped together, whereas if there is a relatively low count of key point matches, then two BB images may not be grouped together. The thresholds for what constitutes a "high count" or a "low count" of key point matching may be selected as a parameter of the system to meet desired BB image grouping targets. Objects of interest are grouped via key point detection such that each group corresponds to a substantially different perspective view of the object of interest and each image in a group depicts a substantially similar perspective view of the first object of interest.

BB images are then grouped using image classification to create a group of training datasets for each image classification for anomaly detection. Anomalies are data patterns that have different data characteristics from normal instances. In the context of image classification, anomalies represent images of an object that have different characteristics from normal images of the object. The ability to identify anomalous images has significant relevance, because the use of anomalous images for template matching as described below can produce unwanted outputs when unlabeled images are processed. Most anomaly detection approaches, including classification-based methods, construct a profile of normal instances, then identify anomalies as those that do not conform to the normal profile.

Anomaly detection algorithms are provided as standard routines in machine learning packages, such as OpenCV and Scikit-learn.

In some embodiments, an Isolation Forest algorithm may be used for anomaly detection. As is known in the art, an Isolation Forest algorithm 'isolates' observations by randomly selecting a feature of an image and then randomly selecting a split value between the maximum and minimum values of the selected feature. Since recursive partitioning can be represented by a tree structure, the number of splits required to isolate a sample is equivalent to the path length from the root node to the terminating node. This path length, averaged over a forest of such random trees, is a measure of normality and can be used as a decision function. Random partitioning produces noticeably shorter paths for anomalies. Hence, when a forest of random trees collectively produce shorter path lengths for particular samples, they are highly likely to be anomalies. The output of the Isolation Forest algorithm is an anomaly score that can be used to determine whether a particular BB image is anomalous. BB images that have been determined to be anomalous may be removed from the set of BB images that are used for image classification as described below.

Figure 9:
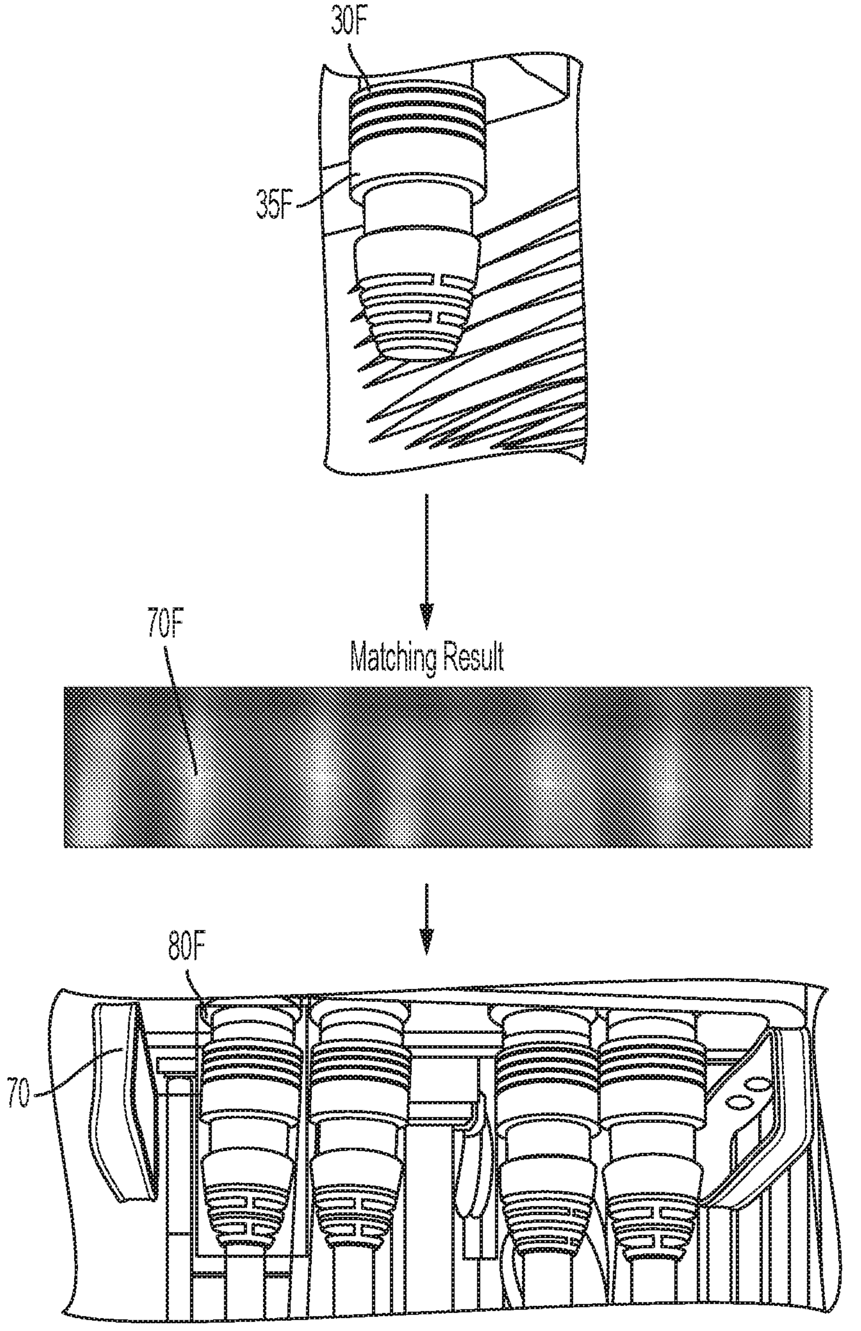
FIG. 9 illustrates object detection via template matching according to some embodiments.
Figure 10:
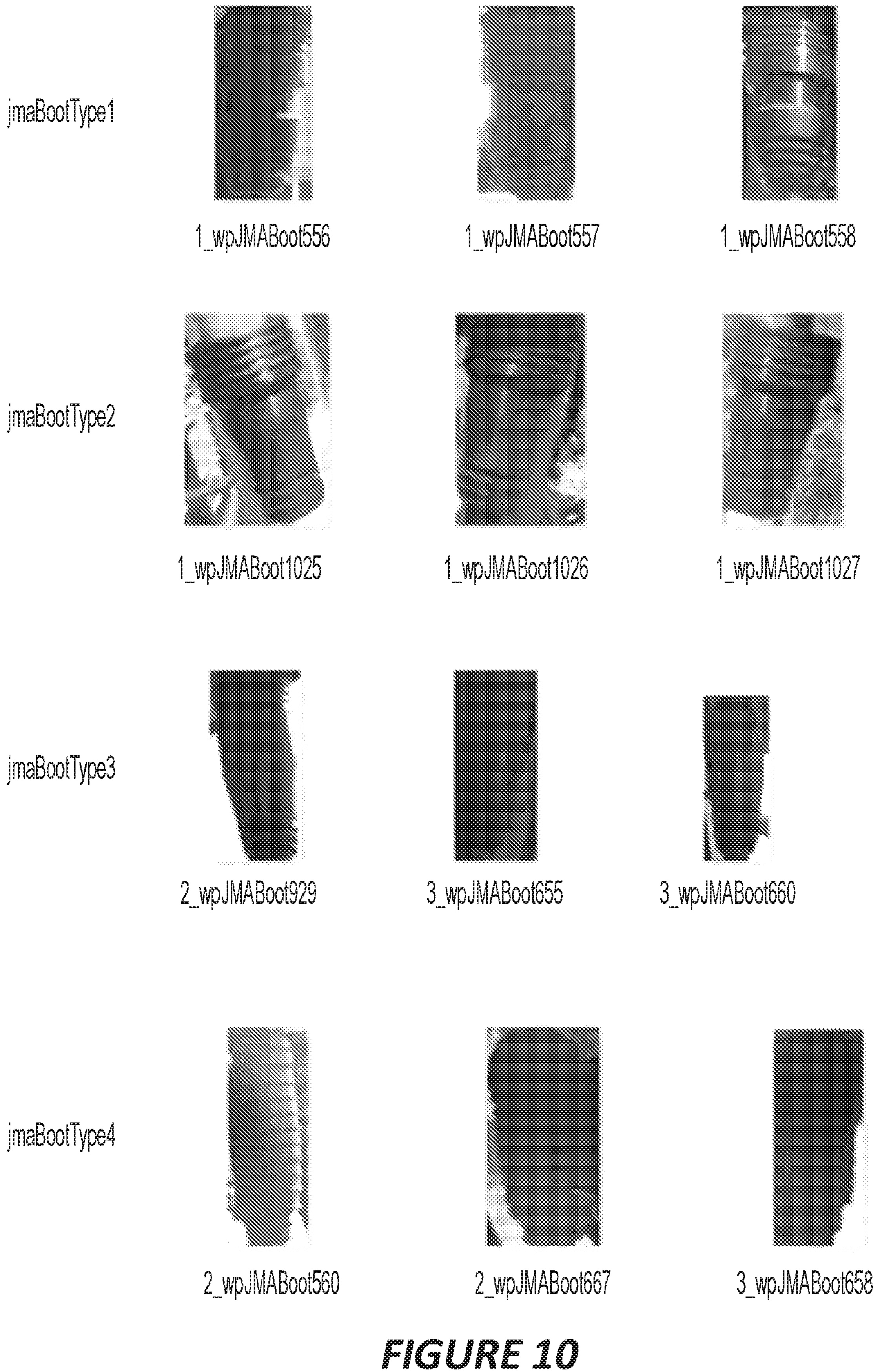
FIG. 10 illustrates grouping of bounding boxes according to object type.

Next, the unlabeled/unprocessed images are processed to determine the existence and location of objects of interested depicted therein through template matching. The BB images obtained as described above via manual BB identification and object classification are used as templates in this process. Template matching, which is provided as a standard algorithm in machine learning systems, is illustrated in FIGS. 9 and 10. Referring to FIG. 9, a single BB image 30F from the set of annotated BB images is used as a template 35F. The template 35F is correlated across an unlabeled picture 70 to determine if the object shown in template 35F is present in the picture 70, and a correlation value is calculated at each point. Correlation results are shown in the image at the bottom of the figure, in which brighter pixels indicate a better template match. If the correlation value is higher than a threshold at a given point in the picture 70, the template 35F is deemed to match. Based on correlation of the template 35F with the picture 70, a bounding box 80F is identified in the picture 70 that corresponds to a location in the picture 70 of the object depicted in the BB image 30F.

This process is repeated for each BB image in the set of BB images generated as described above to generate a plurality of bounding boxes for each object of each type of object depicted in the picture 70. Referring to FIG. 10, when targeting similar products, the systems/methods group templates according to the type of object. Template matching is best applied where almost exact match has occurred during key point and grouping, but also image classification grouping was used.

Consolidation of bounding boxes is illustrated in FIGS. 11 to 15.

Figure 11:
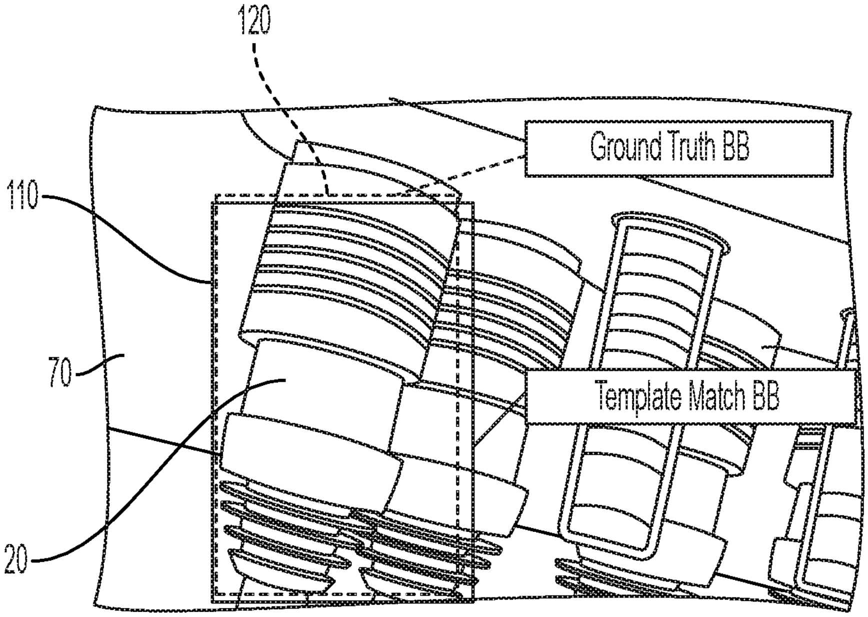
FIGS. 11, 12 and 13 illustrate bounding box consolidation according to some embodiments.
Figure 12:
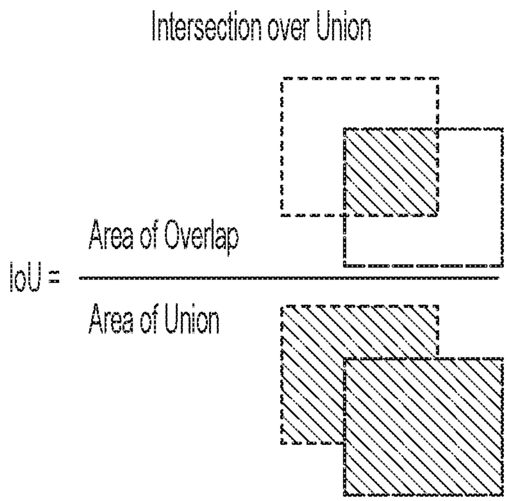

Once a plurality of bounding boxes have been generated for a picture based on template matching, the systems/methods consolidate the bounding boxes into a single bounding box for each instance of the object in the picture. Bounding box consolidation may be performed by, for each bounding box, calculating a value of "intersection over union" for the bounding box relative to a ground truth bounding box, as illustrated in FIGS. 11 and 12. Referring to FIG. 11, a picture 70 depicts an object of interest 20. A bounding box 110 has been generated via template matching and is shown in the picture 70. Also shown is a "ground truth" bounding box 120, which is a bounding box that is assumed to be the true or best location of the object of interest 20. An area of overlap (intersection) of the bounding boxes 142, 144 is calculated, and the intersection is divided by an area of union of the bounding boxes 142, 144 to obtain a value of "intersection over union" (or IoU) as illustrated in FIG. 12.

Figure 13:
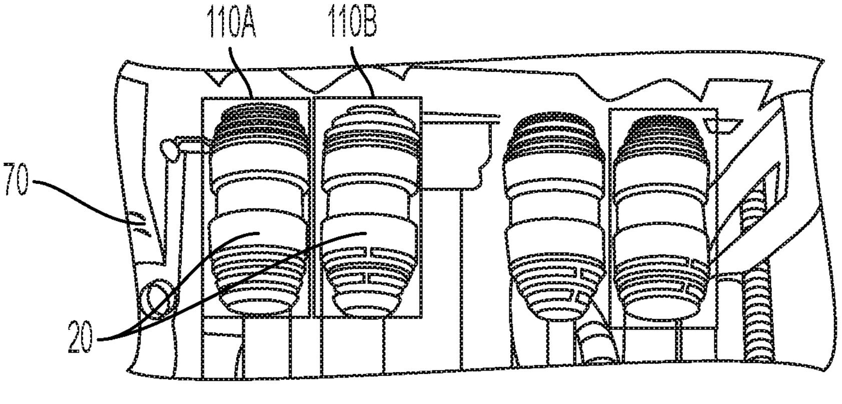

FIG. 13 shows a picture 70 illustrating a first plurality of bounding boxes 110A around a first instance of an object 20 and second plurality of bounding boxes 110B around a second instance of an object 20 in the picture prior to bounding box consolidation.

The systems/methods according to some embodiments evaluate a single bounding box as the "ground truth" relative to the entire list of predicted detections given a certain IoU threshold that must be met. Bounding boxes that do not meet the threshold are removed from the list, while bounding boxes that do meet the threshold are averaged together to create a single bounding box to represent the object That is, for each group, the average values of Xmin, Ymin and Xmax, Ymax are stored to form one single bounding box representing the entire group.

Figure 14:
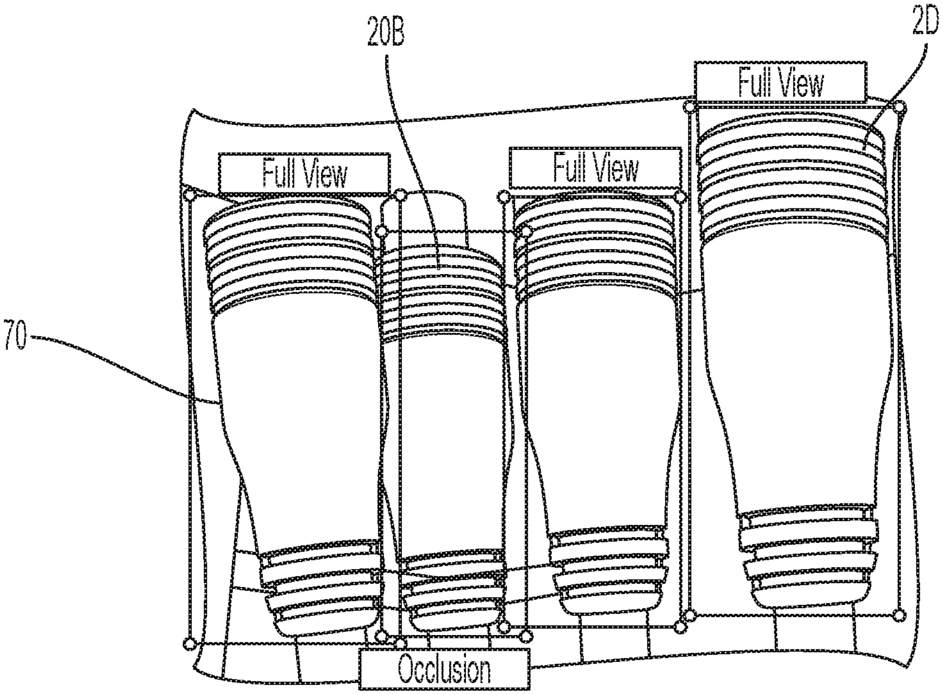
FIGS. 14, 15 and 16 illustrate final processing and output of labeled images according to some embodiments.
Figure 15:
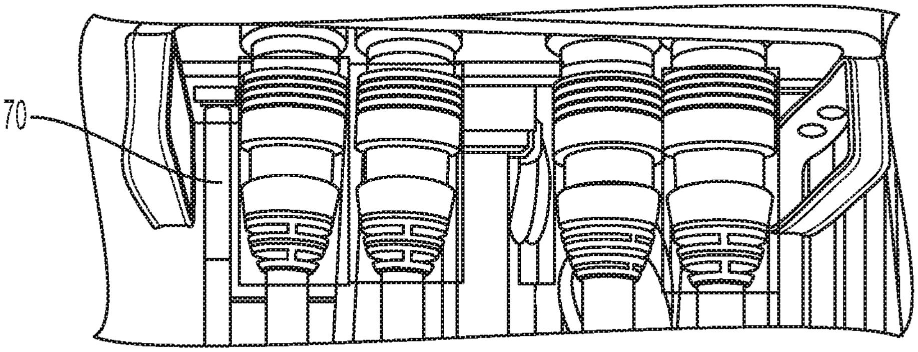

It will be appreciated that there may be a need to evaluate the bounding boxes to remove occlusions where the IoU does not meet the threshold, but the occlusions templates fall within a full BB. FIG. 14 illustrates occlusion of a target object 20B compared to a complete visible object 20D in a picture 70. FIG. 15 illustrates a picture 70 in which final IoU evaluations were observed, grouped and consolidation was applied. The results may then be stored with reference to the image file, and classification with bounding box defined by the coordinates (xmin, ymin), and (xmax, ymax).

Figure 16:
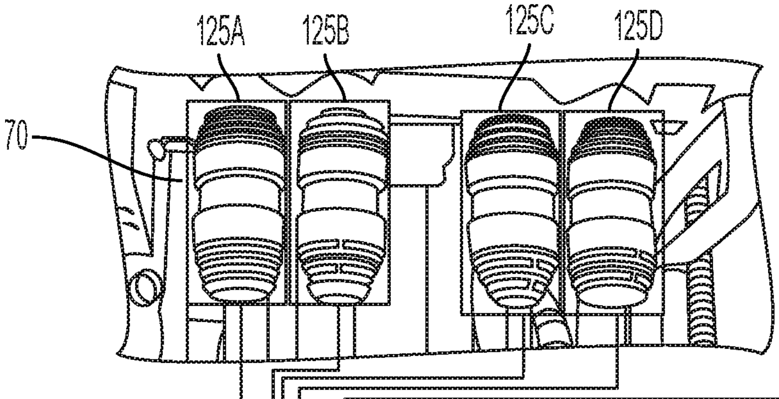

Final creation of annotated images is illustrated in FIG. 16, which shows a picture 70 in which four labeled bounding boxes 125A-125D have been identified for products of a defined product type (productType1) along with a corresponding table of data containing the classifications and bounding box definitions.

Figure 17:
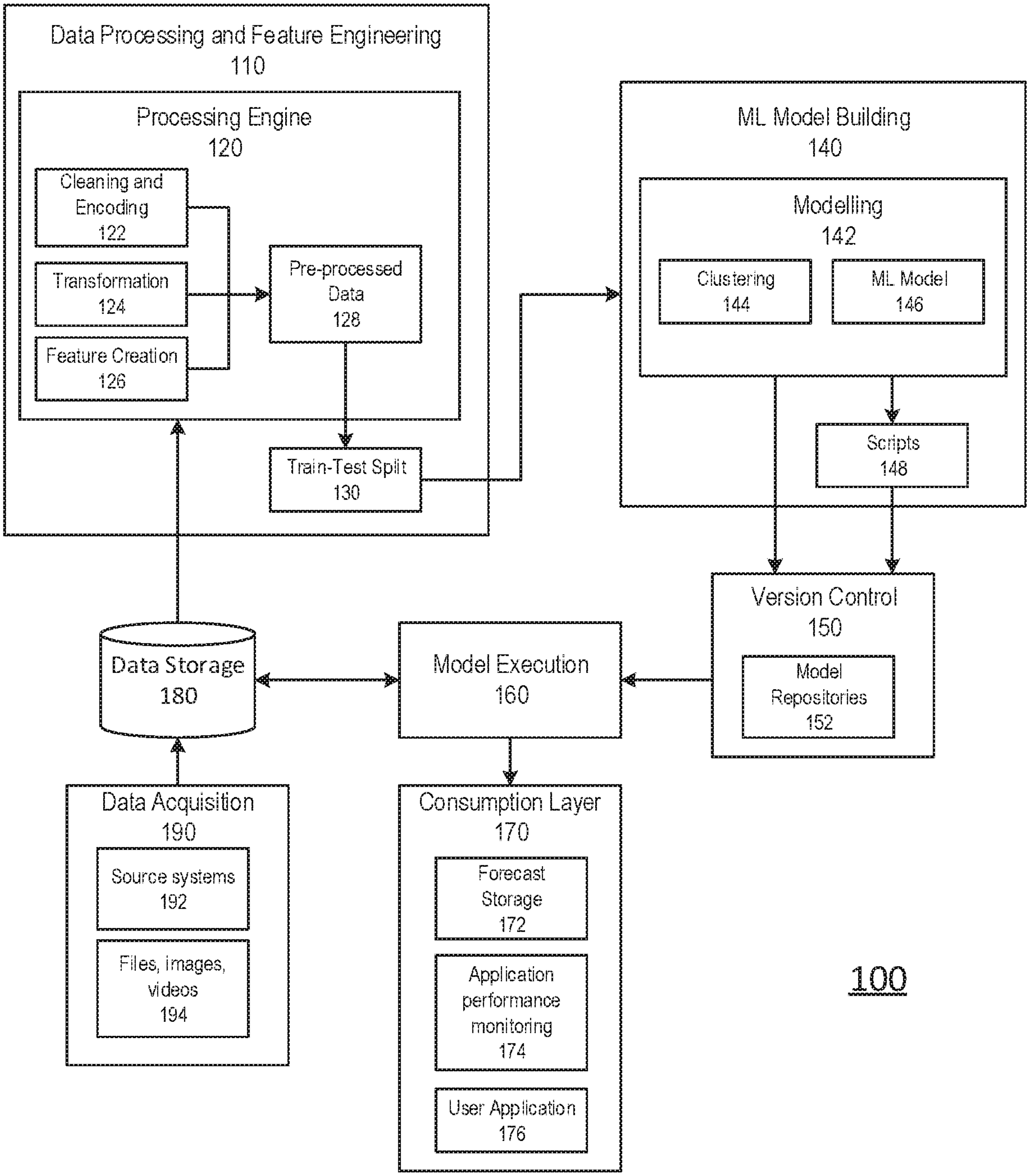
FIG. 17 illustrates an overview of a complete machine learning cycle that can utilize labeled images generated in accordance with some embodiments.

FIG. 17 illustrates an overview of a complete machine learning cycle 100 that can utilize image data that has been annotated according to embodiments described herein. As shown therein, data stored in a data storage unit 180 is provided to a data processing and feature engineering system 115. The data may include, for example, image data containing pictures showing objects of interest, which may be acquired from source systems 192 and/or image files 194. The input data is pre-processed by a processing engine 125 to generate pre-processed data 128. Pre-processing the data may include cleaning and encoding 122, transformation 124, feature creation 126, etc. The pre-processed data 128 is then split into a training set and a test set by a train-test split process 130. The data is then provided to a machine learning model building system 140 that includes a modeling function 142 for clustering the data 144 and generating a machine learning model 146.

The machine learning model and data clustering steps are saved as one or more scripts 148. The output of the modelling system may optionally be provided to a version control system 150 that includes structured model repositories 152 and allows collaborative input to the modeling system.

The model may then be executed against new data stored in the data storage unit 180, and the output of the model execution may be provided to a consumption layer 170 that may perform forecast storage 172, application performance modelling 174 and user application (e.g., presentation, display, interpretation, etc.) of the results. The output of the model may also be stored in the data storage unit 180 to help refine the model in future iterations.

Figure 18:
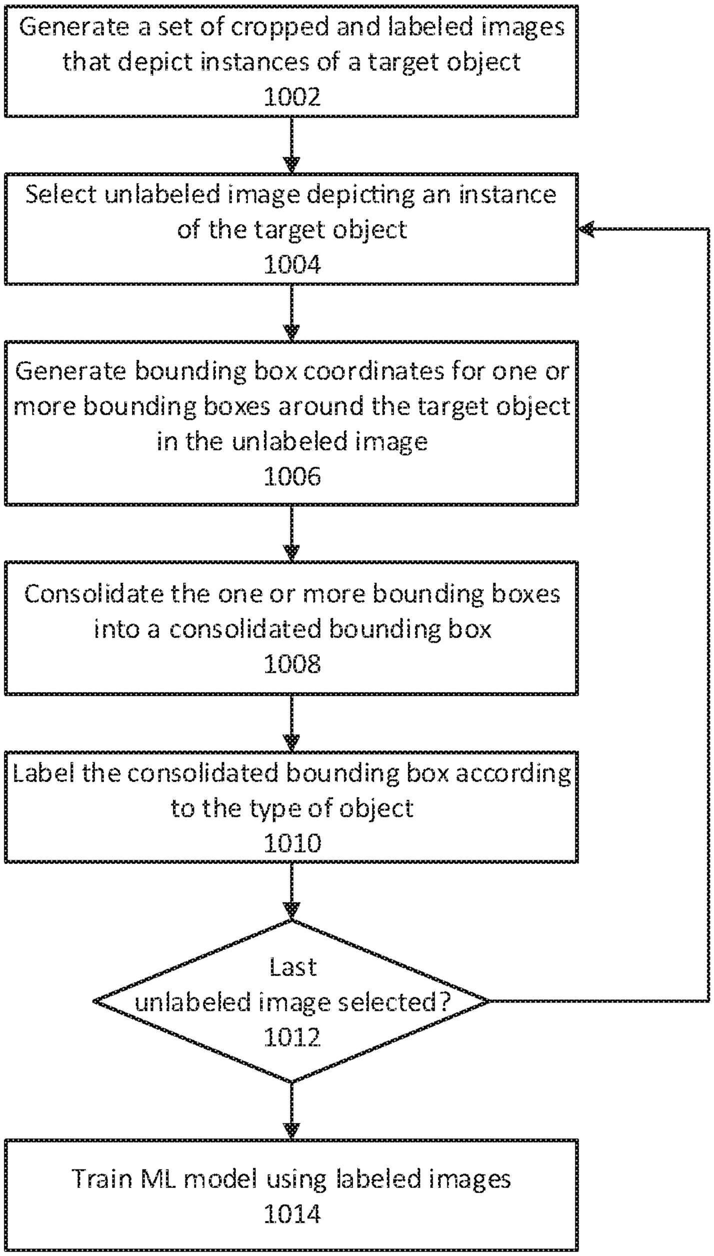
FIGS. 18 and 19 are flowcharts illustrating operations of systems/methods according to some embodiments.

Accordingly, operations of systems/methods to annotate a set of unlabeled images that depict one or more instances of an object of interest are illustrated in FIG. 18. As shown therein, the operations first generate a set of cropped and labeled images that depict instances of the target object, i.e., an object of the type of object of interest (block 1002). Generating the set of cropped and labeled images may include providing a first set of raw images containing one or more instances of the type of object, generating sets of bounding box coordinates of bounding boxes surrounding the one or more instances of the type of object in each of the raw images in the set of raw images, and cropping the instances of the type of object from each of the raw images using the bounding box coordinates of the bounding boxes around the instances of the type of object to provide a set of cropped and labeled images.

Next, the operations select an unlabeled image from the set of unlabeled images that depict an instance of the target object (block 1004).

The operations then generate bounding box coordinates for one or more bounding boxes around the instance of the target object in the selected image (block 1006). Bounding box coordinates are generated via a template matching technique using the cropped and labeled images showing the target object as templates. In particular, generating the bounding box coordinates for the one or more bounding boxes around the instance of the object in the unlabeled image may include repeatedly performing a template matching technique on the first unlabeled image using each of the labeled images as a template. Because a plurality of templates may be used, a number of different bounding boxes may be generated.

Bounding box coordinates may be generated by correlating the templates of the labeled images with the unlabeled image to generate a correlation metric and comparing the correlation metric to a threshold.

Next, the bounding boxes generated via template matching are consolidated into a single bounding box (block 1008), which is then labeled according to the object type of the target object (block 1010). Consolidating the one or more bounding boxes into a consolidated bounding box around the instance of the object may include identifying a bounding box from among the one or more bounding boxes as a ground truth bounding box, and for each of the one or more bounding boxes other than the ground truth bounding box, generating an intersection over union metric, wherein the intersection over union metric is calculated as an area of intersection of the selected bounding box with the ground truth bounding box divided by an area of overlap of the selected bounding box with the ground truth bounding box. The method may further include excluding bounding boxes from the one or more bounding boxes for which the intersection over union metric is less than a predetermined threshold, and averaging the one or more bounding boxes other than the excluded bounding boxes to obtain the consolidated bounding box.

An anomaly detection technique is applied to identify anomalous bounding boxes from the one or more bounding boxes around the instance of the object in the unlabeled image.

The set of labeled images may be divided into a plurality of subsets of labeled images, where each subset of labeled images contains a view of the object from a unique perspective. For each subset of labeled images, the method may include repeating steps of using the labeled images in the subset of labeled images as templates, generating bounding box coordinates for one or more bounding boxes around the instance of the object in the unlabeled image, consolidating the one or more bounding boxes generated based on the subset of labeled images into a consolidated bounding box around the instance of the object, and labeling the consolidated bounding box as corresponding to the object to generate a labeled output image including bounding box coordinates of the consolidated bounding box.

The operations then proceed to select the next image from the set of unlabeled images, and the operations of blocks 1006-1010 are repeated for the next selected image.

This process may be repeated for multiple different types of objects of interest. That is, the unlabeled images may be repeatedly processed to generate and consolidate bounding boxes corresponding to different types of target objects. Once all of the unlabeled images have been processed, the resulting labeled images may be used to train a machine learning model (block 1014).

Figure 19:
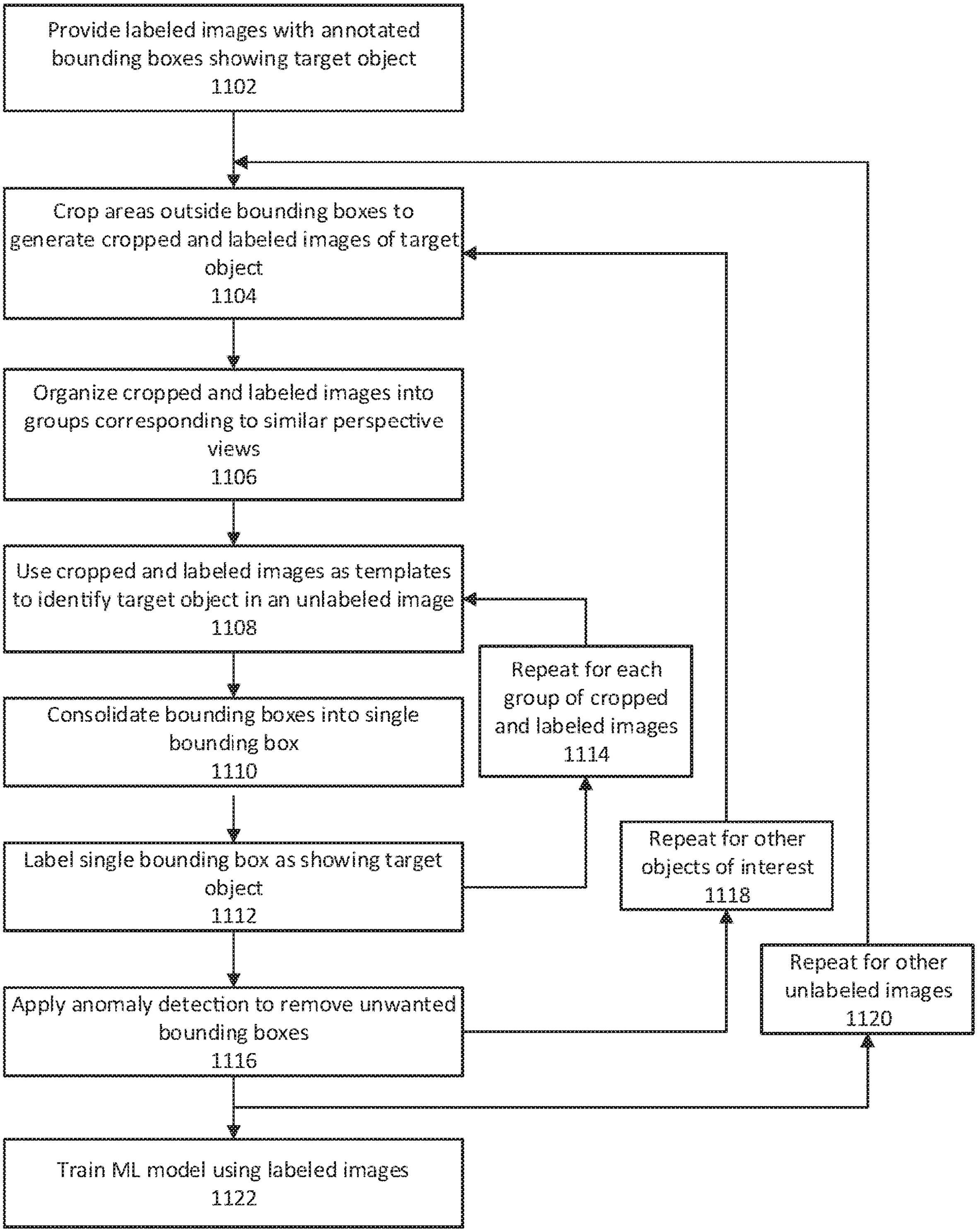

More generally, operations according to some embodiments include the operations shown in FIG. 19. As shown therein, the operations include:

Block 1102: Provide a plurality of labeled images, each labeled image having one or more bounding boxes drawn by a user around one or more corresponding ones of a plurality of objects of interest, and one or more labels/annotations that identify each of the one or more corresponding objects of interest.

Block 1104: For a first one of the plurality of objects of interest, crop out areas outside of the user-drawn bounding boxes corresponding to the first object of interest to generate a plurality of cropped and labeled images.

Block 1106: Using one or more key point detection techniques, organize the plurality of cropped and labeled images into different groups of cropped and labeled images, each group corresponding to a substantially different perspective view of the first object of interest and each image in a group depicting a substantially similar perspective view of the first object of interest.

Block 1108: Apply a template matching technique to a first one of a first plurality of unlabeled images using each one of the cropped and labeled images in a first one of the groups as a template to identify an instance of the first object of interest in the unlabeled image and generate one or more bounding boxes around the first object of interest.

Block 1110: If more than one bounding box is produced by application of the template matching technique with the first group of cropped and labeled images, consolidate the bounding boxes into a single bounding box using an intersection of union technique.

Block 1112: Label the single bounding box as corresponding to the object of interest associated with the first group of cropped and labeled images;

Block 1114: Repeat blocks 1108 to 1112 using the cropped and labeled images of each of the remaining groups of cropped and labeled images as templates to determine whether one or more additional perspective views of the first object of interest are present in the first unlabeled image and, if so, generate bounding boxes and labels corresponding to the one or more additional perspective views of the first object of interest.

Block 1116: Apply an anomaly detection technique to remove any unwanted bounding boxes produced in blocks 1108 to 1112.

Block 1118: Repeat blocks 1104 to 1116 for one or more other objects of interest of the plurality of objects of interest.

Block 1120: Repeat blocks 1102 to 1118 using the remaining unlabeled images of the first plurality of unlabeled images to produce a set of training images in which the plurality of objects of interest have bounding boxes drawn around them and a corresponding label associated with each bounding box.

Block 1122: Use the training images to train a machine learning algorithm to identify the plurality of objects of interest in a second plurality of unlabeled images.

Figure 20:
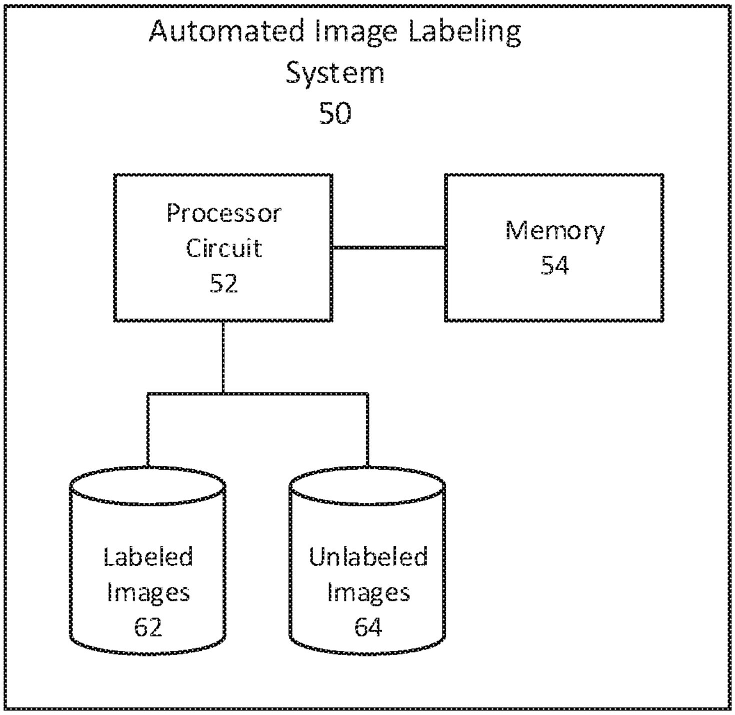
FIG. 20 illustrates some aspects of an automated image labeling system according to some embodiments.

FIG. 20 illustrates some aspects of an automated image labeling system 50. In particular, the system 50 includes a processing circuit 52 and a memory 54 coupled to the processor circuit. The system 50 also includes a repository 62 of labeled images and a repository 64 of unlabeled images. The system 50 performs for performing some or all of the operations illustrated in FIGS. 2-4 and 18-19.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above.

CNN Convolutional Neural Network
IoU Intersection over Union
BB Bounding Box
GT Ground-Truth
DT Detections
min Minimal
max Maximum In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of generating labeled training images for a machine learning system, comprising:
providing a set of labeled images, each of the labeled images in the set of labeled images depicting an instance of an object and comprising a label identifying a type of the object;
providing an unlabeled image including an instance of the object;
generating bounding box coordinates for bounding boxes around the instance of the object in the unlabeled image using the labeled images in the set of labeled images as templates;
excluding bounding boxes from the bounding boxes for which a corresponding intersection over union metric is less than a predetermined threshold;
averaging the bounding boxes other than the excluded bounding boxes to obtain a consolidated bounding box around the instance of the object in the unlabeled image; and
labeling the consolidated bounding box according to the type of the object to generate a labeled output image including bounding box coordinates of the consolidated bounding box.

2. The method of claim 1, wherein generating the bounding box coordinates for the bounding boxes around the instance of the object in the unlabeled image comprises repeatedly performing a template matching technique on the unlabeled image using each of the labeled images as a template.

3. The method of claim 1, wherein providing the set of labeled images comprises:
providing a first set of raw images each containing one or more manually labeled instances of the object;
generating sets of bounding box coordinates of bounding boxes surrounding the one or more labeled instances of the object in each of the raw images in the set of raw images; and
cropping the labeled instances of the object from each of the raw images using the bounding box coordinates of the bounding boxes around the labeled instances of the object to provide a set of cropped and labeled images.

4. The method of claim 1, further comprising:
identifying a bounding box from among the bounding boxes as a ground truth bounding box; and
for each of the bounding boxes other than the ground truth bounding box, generating the corresponding intersection over union metric, wherein the corresponding intersection over union metric is calculated as an area of intersection of the selected bounding box with the ground truth bounding box divided by an area of overlap of the selected bounding box with the ground truth bounding box.

5. The method of claim 1, further comprising:
applying an anomaly detection technique to identify anomalous bounding boxes from the bounding boxes around the instance of the object in the unlabeled image.

6. The method of claim 1, further comprising:
dividing the set of labeled images into a plurality of subsets of labeled images, wherein each subset of labeled images comprises a view of the object from a unique perspective; and
for each subset of labeled images, repeating steps of:
using the labeled images in the subset of labeled images as templates, generating bounding box coordinates for the bounding boxes around the instance of the object in the unlabeled image;
consolidating the bounding boxes generated based on the subset of labeled images into a consolidated bounding box around the instance of the object; and
labeling the consolidated bounding box as corresponding to the object to generate a labeled output image including bounding box coordinates of the consolidated bounding box.

7. The method of claim 1, wherein the unlabeled image is one of a plurality of unlabeled images, the method further comprising, for each unlabeled image of the plurality of unlabeled images, performing operations of generating bounding box coordinates for bounding boxes around the instance of the object in the unlabeled image, consolidating the bounding boxes into a consolidated bounding box around the instance of the object, and labeling the consolidated bounding box as corresponding to the object to generate a labeled output image including bounding box coordinates of the consolidated bounding box, to obtain a plurality of labeled output images;
the method further comprising training a machine learning algorithm to identify objects of interest in a second unlabeled image using the plurality of labeled output images.

8. The method of claim 1, wherein generating bounding box coordinates for the bounding boxes around the instance of the object in the unlabeled image using the labeled images in the set of labeled images as templates comprises:
correlating the labeled images with the unlabeled image to generate a correlation metric; and
comparing the correlation metric to a threshold.

9. The method of claim 1, further comprising:
training a machine learning algorithm to identify objects of interest in a second unlabeled image using the labeled output image.

10. An image labeling system, comprising:
a processing circuit; and
a memory coupled to the processing circuit, wherein the memory comprises computer program instructions that, when executed by the processing circuit, cause the image labeling system to perform operations comprising:
providing a set of labeled images, each of the labeled images in the set of labeled images depicting an instance of an object and comprising a label identifying a type of the object;
providing an unlabeled image including an instance of the object;
generating bounding box coordinates for bounding boxes around the instance of the object in the unlabeled image using the labeled images in the set of labeled images as templates;

excluding bounding boxes from the bounding boxes for which a corresponding intersection over union metric is less than a predetermined threshold;

averaging the bounding boxes other than the excluded bounding boxes to obtain a consolidated bounding box around the instance of the object in the unlabeled image; and labeling the consolidated bounding box according to the type of object to generate a labeled output image including bounding box coordinates of the consolidated bounding box.

11. The image labeling system of claim 10, wherein generating the bounding box coordinates for the bounding boxes around the instance of the object in the unlabeled image comprises repeatedly performing a template matching technique on the unlabeled image using each of the labeled images as a template.

12. The image labeling system of claim 11, wherein providing the set of labeled images is performed by:

providing a first set of raw images each containing one or more labeled instances of the type of object;

generating sets of bounding box coordinates of bounding boxes surrounding the one or more labeled instances of the type of object in each of the raw images in the set of raw images; and cropping the labeled instances of the type of object from each of the raw images using the bounding box coordinates of the bounding boxes around the labeled instances of the type of object to provide a set of cropped and labeled images.

13. The image labeling system of claim 10, further comprising:

identifying a bounding box from among the bounding boxes as a ground truth bounding box; and for each of the bounding boxes other than the ground truth bounding box, generating the corresponding intersection over union metric, wherein the corresponding intersection over union metric is calculated as an area of intersection of the selected bounding box with the ground truth bounding box divided by an area of overlap of the selected bounding box with the ground truth bounding box.

14. The image labeling system of claim 10, wherein the image labeling system further performs operations comprising:

applying an anomaly detection technique to identify anomalous bounding boxes from the bounding boxes around the instance of the object in the unlabeled image.

15. The image labeling system of claim 10, wherein the image labeling system further performs operations comprising:

dividing the set of labeled images into a plurality of subsets of labeled images, wherein each subset of labeled images comprises a view of the object from a unique perspective; and for each subset of labeled images, repeating steps of:

using the labeled images in the subset of labeled images as templates, generating bounding box coordinates for the bounding boxes around the instance of the object in the unlabeled image;

consolidating the bounding boxes generated based on the subset of labeled images into a consolidated bounding box around the instance of the object; and labeling the consolidated bounding box as corresponding to the object to generate a labeled output image including bounding box coordinates of the consolidated bounding box.

16. The image labeling system of claim 10, wherein the unlabeled image is one of a plurality of unlabeled images, and wherein the image labeling system is further configured to perform operations comprising:

for each unlabeled image of the plurality of unlabeled images, performing operations of generating bounding box coordinates for the bounding boxes around the instance of the object in the unlabeled image, consolidating the bounding boxes into a consolidated bounding box around the instance of the object, and labeling the consolidated bounding box as corresponding to the object to generate a labeled output image including bounding box coordinates of the consolidated bounding box, to obtain a plurality of labeled output images; and training a machine learning algorithm to identify objects of interest in a second unlabeled image using the plurality of labeled output images.

17. The image labeling system of claim 10, wherein generating bounding box coordinates for the bounding boxes around the instance of the object in the unlabeled image using the labeled images in the set of labeled images as templates comprises:

correlating the labeled images with the unlabeled image to generate a correlation metric; and comparing the correlation metric to a threshold.

18. The image labeling system of claim 10, wherein the image labeling system further performs operations comprising:

training a machine learning algorithm to identify objects of interest in a second unlabeled image using the labeled output image.

19. A method of generating labeled training images for a machine learning system, comprising:

providing a plurality of bounding box images showing instances of a target object;

grouping the plurality of bounding box images into groups of bounding box images showing the target object from similar perspectives;

using the bounding box images of a group of bounding box images as templates to identify the target object in an unlabeled image and generating bounding boxes based on template matching;

excluding bounding boxes from the bounding boxes for which a corresponding intersection over union metric is less than a predetermined threshold;

averaging the bounding boxes other than the excluded bounding boxes to obtain a consolidated bounding box;

labeling the consolidated bounding box to provide a labeled image; and training a machine language model using the labeled image.

20. The method of claim 19, further comprising:

for a plurality of groups of labeled bounding box images, repeating operations of using generating bounding boxes based on template matching, excluding the bounding boxes from the bounding boxes for which the corresponding intersection over union metric is less than the predetermined threshold, averaging the bounding boxes other than the excluded bounding boxes to obtain the consolidated bounding box, and labeling the consolidated bounding box to provide a labeled image.

* * * * *